US008862572B2

(12) United States Patent
Lucovsky et al.

(10) Patent No.: US 8,862,572 B2
(45) Date of Patent: Oct. 14, 2014

(54) SHARING USER DISTRIBUTED SEARCH RESULTS

(75) Inventors: Mark Lucovsky, Montecito, CA (US); Derek L. Collison, Foster City, CA (US); Carl P. Sjogreen, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/366,466

(22) Filed: Mar. 3, 2006

(65) Prior Publication Data
US 2007/0198340 A1 Aug. 23, 2007

Related U.S. Application Data

(60) Provisional application No. 60/774,198, filed on Feb. 17, 2006.

(51) Int. Cl.
*G06F 7/00* (2006.01)
*G06F 17/30* (2006.01)
*G06Q 30/02* (2012.01)

(52) U.S. Cl.
CPC .... *G06F 17/30864* (2013.01); *G06F 17/30867* (2013.01); *G06Q 30/0267* (2013.01); *G06Q 30/02* (2013.01)
USPC ........................................................ 707/722

(58) Field of Classification Search
USPC ...................................................... 705/14.49
See application file for complete search history.

(56) References Cited

U.S. PATENT DOCUMENTS

| | | | |
|---|---|---|---|
| 6,148,298 A * | 11/2000 | LaStrange et al. ................ 707/5 | |
| 6,175,877 B1 | 1/2001 | Zerber | |
| 6,353,448 B1 * | 3/2002 | Scarborough et al. ........ 715/744 | |
| 6,385,602 B1 | 5/2002 | Tso et al. | |
| 6,418,432 B1 | 7/2002 | Cohen et al. | |
| 6,484,162 B1 * | 11/2002 | Edlund et al. ...................... 707/3 | |
| 6,493,702 B1 * | 12/2002 | Adar et al. .................... 707/706 | |
| 6,523,037 B1 | 2/2003 | Monahan et al. | |
| 6,546,388 B1 | 4/2003 | Edlund et al. | |
| 6,574,654 B1 * | 6/2003 | Simmons et al. ............. 718/104 | |
| 6,594,654 B1 | 7/2003 | Salam et al. | |

(Continued)

FOREIGN PATENT DOCUMENTS

EP    1 178 411 A1    2/2002
GB    2 324 627 A    10/1998

OTHER PUBLICATIONS

"Point-and-click", Jul. 10, 2004, Wikipedia, Wayback Machine, p. 1.*
"Check box", May 8, 2004, Wikipedia, Wayback Machine, p. 1.*

(Continued)

*Primary Examiner* — Taelor Kim
(74) *Attorney, Agent, or Firm* — Harrity & Harrity, LLP

(57) ABSTRACT

A universal distributed search system allows users to find and distribute search results (possibly including advertisements) to those with whom they communicate. The search results can be easily distributed by the user via a simple interface that allows the search results to be easily added to the user's content. In one implementation, a content creation application includes a first interface configured to facilitate composition of a message by a user and a second interface configured to receive a search query from the user, display search results relating to the search query, and receive selections of the search results from the user. The messaging application automatically incorporates, in response to the selections, the selected ones of the search results into the message in the first interface.

19 Claims, 11 Drawing Sheets

(56) References Cited

U.S. PATENT DOCUMENTS

| | | | |
|---|---|---|---|
| 6,732,154 B1 | 5/2004 | Poulton et al. | |
| 6,781,608 B1* | 8/2004 | Crawford | 715/758 |
| 6,963,867 B2 | 11/2005 | Ford et al. | |
| 7,003,506 B1* | 2/2006 | Fisk et al. | 707/693 |
| 7,010,533 B1 | 3/2006 | Kutsumi et al. | |
| 7,149,960 B1* | 12/2006 | Brooks et al. | 715/234 |
| 7,181,445 B2* | 2/2007 | Bebo et al. | 1/1 |
| 7,254,774 B2 | 8/2007 | Cucerzan et al. | |
| 7,299,222 B1* | 11/2007 | Hogan et al. | 707/3 |
| 7,496,559 B2* | 2/2009 | Gross et al. | 1/1 |
| 7,730,113 B1 | 6/2010 | Payette et al. | |
| 7,844,603 B2 | 11/2010 | Lucovsky et al. | |
| 2001/0025274 A1 | 9/2001 | Zehr et al. | |
| 2001/0034734 A1* | 10/2001 | Whitley et al. | 707/104.1 |
| 2002/0016736 A1 | 2/2002 | Cannon et al. | |
| 2002/0091829 A1* | 7/2002 | Wood et al. | 709/227 |
| 2002/0152244 A1* | 10/2002 | Dean et al. | 707/530 |
| 2002/0152267 A1* | 10/2002 | Lennon | 709/203 |
| 2003/0065663 A1* | 4/2003 | Chu | 707/10 |
| 2003/0083979 A1 | 5/2003 | Walker et al. | |
| 2003/0167315 A1* | 9/2003 | Chowdhry et al. | 709/218 |
| 2003/0225853 A1* | 12/2003 | Wang et al. | 709/217 |
| 2004/0030540 A1 | 2/2004 | Ovil et al. | |
| 2004/0064447 A1 | 4/2004 | Simske et al. | |
| 2004/0093323 A1* | 5/2004 | Bluhm et al. | 707/3 |
| 2004/0143667 A1* | 7/2004 | Jerome | 709/228 |
| 2004/0167905 A1* | 8/2004 | Eakin | 707/100 |
| 2004/0193580 A1 | 9/2004 | Martin et al. | |
| 2004/0193691 A1 | 9/2004 | Chang | |
| 2004/0194099 A1* | 9/2004 | Lamping et al. | 718/100 |
| 2004/0215506 A1 | 10/2004 | Mcewan et al. | |
| 2004/0230598 A1 | 11/2004 | Robertson et al. | |
| 2004/0267612 A1 | 12/2004 | Veach | |
| 2004/0267700 A1* | 12/2004 | Dumais et al. | 707/2 |
| 2004/0267730 A1 | 12/2004 | Dumais et al. | |
| 2005/0004909 A1 | 1/2005 | Stevenson et al. | |
| 2005/0027695 A1 | 2/2005 | John et al. | |
| 2005/0028188 A1 | 2/2005 | Latona et al. | |
| 2005/0050014 A1 | 3/2005 | Gosse et al. | |
| 2005/0050023 A1 | 3/2005 | Gosse et al. | |
| 2005/0091314 A1 | 4/2005 | Blagsvedt et al. | |
| 2005/0097204 A1 | 5/2005 | Horowitz et al. | |
| 2005/0114299 A1* | 5/2005 | Bharat | 707/2 |
| 2005/0131762 A1 | 6/2005 | Bharat et al. | |
| 2005/0144158 A1 | 6/2005 | Capper et al. | |
| 2005/0149397 A1 | 7/2005 | Morgenstern et al. | |
| 2005/0192958 A1 | 9/2005 | Widjojo et al. | |
| 2005/0222903 A1 | 10/2005 | Buchheit et al. | |
| 2005/0228780 A1 | 10/2005 | Diab et al. | |
| 2005/0234850 A1 | 10/2005 | Buchheit et al. | |
| 2005/0234883 A1 | 10/2005 | Szeto et al. | |
| 2005/0267870 A1* | 12/2005 | Everett-Church et al. | 707/3 |
| 2005/0289113 A1 | 12/2005 | Bookstaff | |
| 2006/0005113 A1 | 1/2006 | Baluja et al. | |
| 2006/0020506 A1 | 1/2006 | Axe et al. | |
| 2006/0031214 A1 | 2/2006 | Solaro et al. | |
| 2006/0041553 A1 | 2/2006 | Paczkowski et al. | |
| 2006/0041589 A1 | 2/2006 | Helfman et al. | |
| 2006/0042483 A1 | 3/2006 | Work et al. | |
| 2006/0080303 A1 | 4/2006 | Sargent et al. | |
| 2006/0095404 A1 | 5/2006 | Adelman et al. | |
| 2006/0095412 A1 | 5/2006 | Zito et al. | |
| 2006/0230012 A1 | 10/2006 | Ruvolo et al. | |
| 2006/0253580 A1 | 11/2006 | Dixon et al. | |
| 2006/0259494 A1* | 11/2006 | Watson et al. | 707/10 |
| 2006/0271438 A1 | 11/2006 | Shotland et al. | |
| 2006/0294189 A1* | 12/2006 | Natarajan et al. | 709/206 |
| 2007/0038616 A1* | 2/2007 | Guha | 707/4 |
| 2007/0078835 A1 | 4/2007 | Donnelli | |
| 2007/0106659 A1* | 5/2007 | Lu et al. | 707/5 |
| 2007/0185846 A1 | 8/2007 | Budzik et al. | |
| 2007/0185864 A1 | 8/2007 | Budzik et al. | |
| 2007/0203906 A1* | 8/2007 | Cone et al. | 707/6 |
| 2007/0236732 A1 | 10/2007 | Henry | |
| 2008/0005118 A1 | 1/2008 | Shakib et al. | |
| 2008/0010273 A1 | 1/2008 | Frank | |
| 2008/0016441 A1 | 1/2008 | Tabin | |
| 2010/0042931 A1 | 2/2010 | Dixon et al. | |
| 2010/0161429 A1* | 6/2010 | Mandel | 705/14.73 |
| 2010/0195909 A1 | 8/2010 | Wasson et al. | |
| 2012/0185465 A1 | 7/2012 | Lucovsky et al. | |

OTHER PUBLICATIONS

"Software as a service", Jul. 21, 2005, Wikipedia, Wayback Machine, pp. 1-6.*
"Drag-and-drop", Oct. 10, 2004, Wikipedia, Wayback Machine, pp. 1-3.*
"MIME", Feb. 17, 2004, Wikipedia, Wayback Machine, pp. 1-9.*
"Use the Scratch Pad", http://local.live.com/Help/ScratchPad.html, Apr. 17, 2006 (Print Date), 2 pages.
Sherman, Chris, "Microsoft Launches MSN Virtual Earth", http://searchenginewatch.com/searchday/article.php/3522476, Jul. 25, 2005, 3 pages.
International Search Report and Written Opinion dated Feb. 15, 2008 issued in a corresponding PCT application No. PCT/US07/62352, 9 pages.
"AIM Downloads and Services", Jan. 18, 2002, AOL LLC, Wayback Machine, 3 pages.
".mobi", Jul. 15, 2005, Wikipedia, Wayback Machine, 7 pages.
"Smarter Child", Sep. 13, 2006, Wikipedia, Wayback Machine, 4 pages.
"MIME", Feb. 17, 2004, Wikipedia, Wayback Machine, 10 pages.
International Preliminary Report on Patentability mailed Aug. 28, 2008 issued for corresponding international application No. PCT/US2007/062352, 7 pages.
Blank, C: Firm Debuts Search Results You Can Share, Aug. 23, 2005; http://www.dmnews.com/Firm-Debuts-Search-Results-You-Can-Share/article/88572/; 2 pages.
Co-pending U.S. Appl. No. 11/420,970 entitled "User Distributed Search Results" filed May 30, 2006, by Mark Lucovsky et al.
Co-pending U.S. Appl. No. 11/420,966 entitled "User Distributed Search Results" filed May 30, 2006, by Mark Lucovsky et al.
Co-pending U.S. Appl. No. 11/443,479 entitled "Facilitating Manual User Selection of One or More Ads for Insertion into a Document to be Made Available to Another User or Users" filed May 30, 2006, by Derek Collison et al.
Co-pending U.S. Appl. No. 11/443,455 entitled "Assessing Advertiser Charges for Manual User Insertion of One or More Ads into a Document to be Made Available to Another User or Users, for Distribution of Such Documents, and/or for User Actions on Such Distributed Ads" filed May 30, 2006, by Derek Collison et al.
Co-pending U.S. Appl. No. 11/443,436 entitled "Providing Rewards for Manual User Selection of One or More Ads for Insertion into a Document to be Made Available to Another User or Users, for Distribution of Such Documents, and/or for User Actions on Such Distributed Ads" filed on May 30, 2006, by Derek Collison et al.
Co-pending U.S. Appl. No. 11/443,496 entitled "Determining One or More Performance Metrics Related to Ads Enabled for Manual Insertion into a Document for Distribution, and/or Using Such Performance Metric or Metrics" filed May 30, 2006, by Derek Collison et al.
Co-pending U.S. Appl. No. 11/443,507 entitled "Advertiser Interface for Entering User Distributed Advertisement-Enabled Advertisement Information" filed on May 30, 2006, by Derek Collison et al.
Jinxi Xu et al., "Improving the Effectiveness of Informational Retrieval with Local Context Analysis", vol. 18, No. 1, Jan. 31, 2000, 31 pages.
Lee et al., "A reputation management system in structure peer-to-peer networks", Proceedings of the 14th International workshops on enabling technologies: Infrastructure enterprises, (WETICE'05) 2005, 6 pages.
Budzik, J. et al.; "User Interactions with everyday applications as context for just-in-time information access"; Proceedings of the 5th International Conference on Intelligent User Interfaces, Jan. 2000, pp. 44-51.

(56) References Cited

OTHER PUBLICATIONS

Budzik J. et al.; "Anticipating and contextualizing information needs"; Proceedings of the 62$^{nd}$ Annual Meeting of the American Society for Information Science, 1999, 14 pages.

Zimbra Inc., "Zimlets™—A Mechanism for Integrating Disparate Information Systems and Content with the Zimbra Collaboration Suite™ (ZCS)", 2005, 1 page. http://www.zimbra.com/products/zimlets.html.

Zimbra Inc., "Welcome to the Zimbra Gallery", 2006, 2 pages. http://gallery.zimbra.com/.

European Search Report corresponding to EP 07 75 7151 mailed Mar. 15, 2012, 7 pages.

\* cited by examiner

To: mark@gmail.com
Subject: Canon Macro Lens

Mark, You have a short memory :). The lens I was telling you about is the 100mm F 2.8.

-arthurz
> Arthur, What was the macro lens you were telling me about the other day?
>
> -mark|

Fig. 1A

To: mark@gmail.com
Subject: Canon Macro Lens

Mark, You have a short memory :). The lens I was telling you about is the 100mm F 2.8.
http://consumer.usa.canon.com/ir/controller?act=ModelDetailAct&fcategoryid=155&modelid=7400

-arthurz
> Arthur, What was the macro lens you were telling me about the other day?
>
> -mark|

Fig. 1B

SHARING USER DISTRIBUTED SEARCH RESULTS

This application claims priority under 35 U.S.C. §119 based on U.S. Provisional Application Ser. No. 60/774,198, filed Feb. 17, 2006, the disclosure of which is incorporated herein by reference.

BACKGROUND

A. Field of the Disclosure

The present disclosure relates generally to content creation, and more specifically, to the enhancement of user created content with search results.

B. Description of the Related Art

In an increasingly networked world, users frequently use online sources to create and exchange information. Email, instant messaging (IM), message boards, websites, and blogs are all existing communication technologies through which users can create and distribute content to other users. Frequently, in creating such content, a user may wish to reference other online information sources. For example, a user authoring an email may use a browser to navigate to a web page that the user would like to reference in the email, copy the link (e.g., the uniform resource locator (URL)) from the browser to a "clipboard," and then paste the link from the clipboard into the email. In this manner, the user can create an email message that contains links that are accessible by an eventual reader of the email.

Search engines are a popular tool through which users enter a search query describing information of interest and receive back documents or links to documents that relate to the search query. Frequently, when "researching" content for an email message, IM message, message board post, website post, or blog post, the user may perform one or more searches use one or more search engines to locate online documents relevant to the content. The user may then copy a link into the document using the above-described method of copying and pasting a link to the document. This process for annotating user created content can be tedious, difficult to perform for average users, and often results in textual links in the final content that can be difficult to read.

Accordingly, it would be desirable to improve the above-described content creation process.

SUMMARY

One aspect is directed to a content creation application including a first interface configured to facilitate composition of a message by a user and a second interface configured to receive a search query. The second interface is further configured to display search results relating to the search query and to receive selections of the search results from the user, the content creation application automatically incorporating, in response to the selections, the selected ones of the search results into the message in the first interface.

Another aspect is directed to a method comprising providing a message interface configured to facilitate composition of a message by a user; receiving a search query; initiating a search based on the search query; receiving results of the search; and displaying the results of the search in an interface associated with the message interface, the displayed results of the search each including a selection object. The method further includes receiving selections of the selection objects from the user and associating the results of the search that correspond to the selected ones of the selection objects with the message in the message interface.

Another aspect is directed to a system comprising a plurality of search services, each of the search services operable to receive a search request, execute a search based on the search request to generate search results, and transmit the search results. The system further includes a programming object operable to receive a search request from a user, invoke one or more of the search services to execute the search request, receive the search results transmitted from the plurality of search services, display one or more of the search results to the user, receive a selection of the one or more of the search results, and incorporate, in response to the received selection, the selected one or more of the search results into a message that is being composed by the user.

Yet another aspect is directed to a content creation application that includes a first interface portion configured to facilitate composition of a message by a user of the content creation application and a second interface portion configured to display search results retrieved from a remote search service in response to a request from the user and to automatically incorporate, in response to selection of a search result by the user, the selected search result into the first interface portion.

BRIEF DESCRIPTION OF THE DRAWINGS

The accompanying drawings, which are incorporated in and constitute a part of this specification, illustrate one or more embodiments of the invention and, together with the description, explain the invention. In the drawings, FIGS. 1A-1C are diagrams providing a conceptual overview of concepts relating to user distributed search results;

DETAILED DESCRIPTION

The following detailed description refers to the accompanying drawings. The detailed description does not limit the invention.

Overview

Implementations consistent with the principles of the invention relate to allowing users to distribute search results (possibly including advertisements) to those with whom they communicate. The search results can be easily distributed by the user via a simple interface that allows the search results to be added to the user's content with a single mouse click (or other intuitive gestures or commands). In some implementations, the search results may be automatically formatted when being included into the user's content to create a high quality link within the content.

Figure 1C:
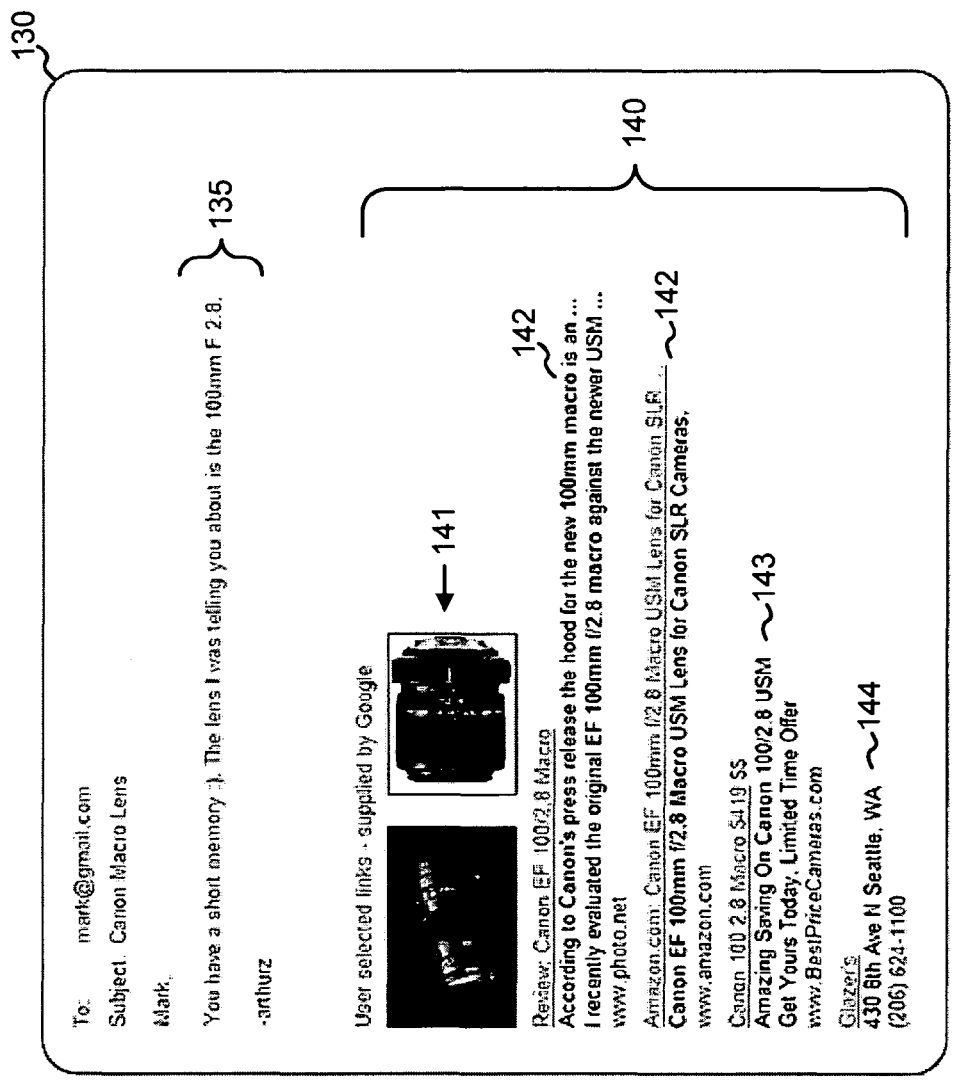

FIGS. 1A-1C are diagrams providing a conceptual overview of concepts described herein. In this example, assume that a user ("Arthur") is responding to an email from a friend ("Mark") requesting information about a camera lens. FIG. 1A is a diagram illustrating an exemplary email 110 in which Arthur responds with a short text message informing Mark that the lens he was telling Mark about is the "100 mm F 2.8." Email 110 exemplifies a typical user email responding to a question. FIG. 1B is a diagram illustrating an another exemplary email, labeled as email 120, in which Arthur responds with the same message informing Mark of the lens about which he was telling Mark. Additionally, in email 120, Arthur pastes a link 125 into email 120 that references a review of the lens. As can be seem by the text of link 125, link 125 is a textually long link that contains a number of terms that convey little information and are probably meaningless to Mark. Email 120 exemplifies a another typical user email responding to a question.

FIG. 1C is a diagram illustrating an exemplary email 130 in which Arthur responds to Mark's email using tools described herein. In contrast to emails 110 and 120, email 130 may include, in addition to the same textual response 135 from Arthur to Mark, a number of links and/or content 140 that were inserted by Arthur when creating the email. Links/content 140 may be information that was automatically generated by the email program used by Arthur in response to Arthur entering a search query such as "Canon100 mm macro lens." As shown, links/content 140 include two images 141, two links 142 returned from a general web search engine, an advertisement 143 returned from an advertisement search engine, and a link 144 to a local company that was generated in response to a search performed by a local search engine. Arthur may have chosen to use each of links/content 140 by, for example, a single mouse click on a graphical button associated with each of the results of the search query.

As can be appreciated from FIGS. 1A-1C, the workflow illustrated by emails 110 and 120 is sub-optimal for both the reader and the email author. In contrast, email 130 (FIG. 1C) would likely be considered a "higher fidelity" communication than either email 110 or 120. Email 130 includes a number of links to documents that are themselves easily read and that were explicitly selected by the author of the email.

System Overview

Figure 2:
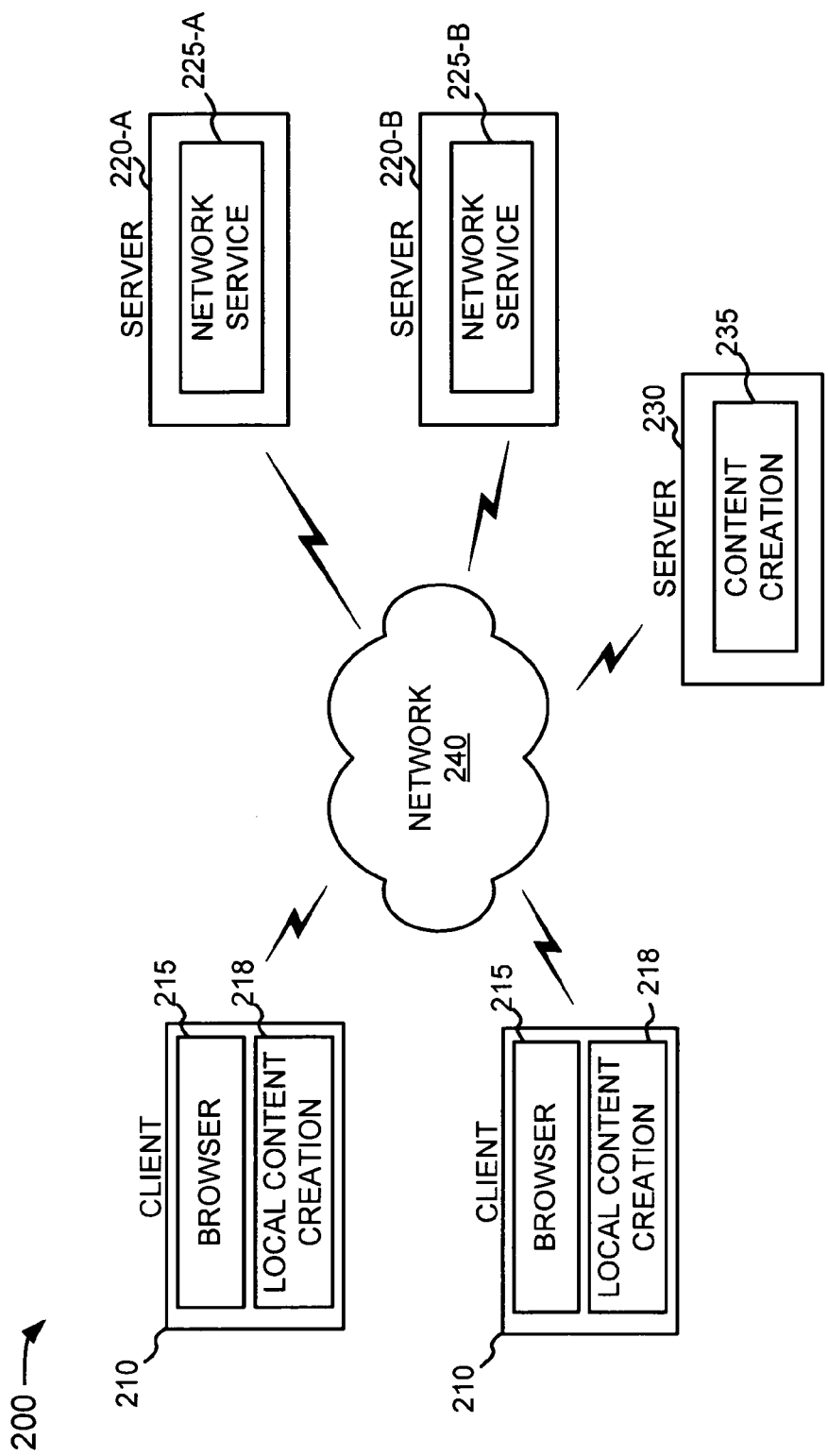
FIG. 2 is a diagram of an exemplary system in which concepts consistent with the principles of the invention may be implemented.

FIG. 2 is a diagram of an exemplary system 200 in which concepts consistent with the principles of the invention may be implemented. System 200 may include multiple clients 210 that can connect to servers, such as servers 220-A, 220-B or 230, via a network 240. Network 240 may include a local area network (LAN), a wide area network (WAN), a telephone network, such as the Public Switched Telephone Network (PSTN), an intranet, the Internet, or a combination of networks. Two clients 210 and three servers 220-A, 220-B and 230 are illustrated as connected to network 240 for simplicity. In practice, there may be more clients and/or servers. Also, in some instances, a client may perform one or more functions of a server and a server may perform one or more functions of a client.

A client 210 may include a device, such as a personal computer, a lap top computer, a wireless telephone, a personal digital assistant (PDA), or another type of computation or communication device. Users of clients 210 may access or receive information from servers 220-A, 220-B or 230.

Clients 210 may include software, such as a web browser 215, for interacting with network 240. Browser programs are well known and are widely available in the art. When browsers or browser programs are discussed herein, these terms are intended to refer to any program that allows a user to browse documents (e.g., web documents), regardless of whether the browser program is a stand alone program or an embedded program, such as a browser program included as part of an operating system.

Clients 210 may also include a local content creation component 218. Local content creation component 218 may include one or more software applications designed to assist the user in generating content. For example, in the context of email, local content creation component 218 may include an email application for composing, sending, and reading email. In the context of instant messaging, local content creation component 218 may include a client IM program for composing, sending, and reading instant messages. In alternate implementations, local content creation component 218 may be embodied as other content creation applications, such as applications designed to assist users in creating blog posts, designing or editing web sites, or posting to message boards.

In some situations, users of clients 210 may create content using networked applications using server 230 in place of or as a supplement to using local content creation components 218. More particularly, server 230 may include content creation component 235, which may provide content creation services to clients 210. For example, server 230 may provide email services to clients 210, such as by providing a web interface through which users of clients 210 can compose, send, and read email messages using browsers 215. In the context of instant messaging, content creation component 235 may be a server side portion of the IM application and may interact with a client-side IM application embodied by local content creation component 218. In alternate implementations, content creation component 235 may be embodied as other network-based content creation applications, such as applications designed to assist users in creating blog posts, designing or editing web sites, or posting to message boards.

In the implementation shown, servers 220-A and 220-B may generally provide network services, such as search services, to clients 210 or to server 230 via network service components 225-A and 225-B. For example, network service component 225-A may include a search engine designed to index documents, such as web pages, connected to network 240. In this implementation, in response to search queries received from clients or other servers in system 200, network service component 225-A may return links to documents determined by network service component 225-A to be relevant to the search query. Network service components 225, as well as being general web search engines, may be specialized web search engines, such as, for example, search engines that return general web search results, image search results, video search results, local search results, geographic search results, product search results, listing search results, email search results, blog search results, message group search results, news search results, digitized content search results, local network search results (e.g. desktop search or corporate network search), or advertisements. The operation of search engines are known in the art and will not be described further herein.

In some implementations, one or more of network service components 225 may provide advertisements. For example, assume that network service component 225-B of server 220-B is an advertisement server. Server 220-B may receive requests from other servers or from clients for advertisements. The advertisements returned by server 220-B to the requesting server or client may be advertisements that are relevant to a search query, document, or other data.

Although illustrated as single devices in FIG. 2, each of servers 220-A, 220-B and 230 may be implemented as, for example, a single computing device or as multiple distributed computing devices. Also, in some implementations, the functionality of multiple servers, such as servers 220-B and 230, may be combined as a single server or a single group of distributed computing devices.

Exemplary Computing Device Architecture

Figure 3:
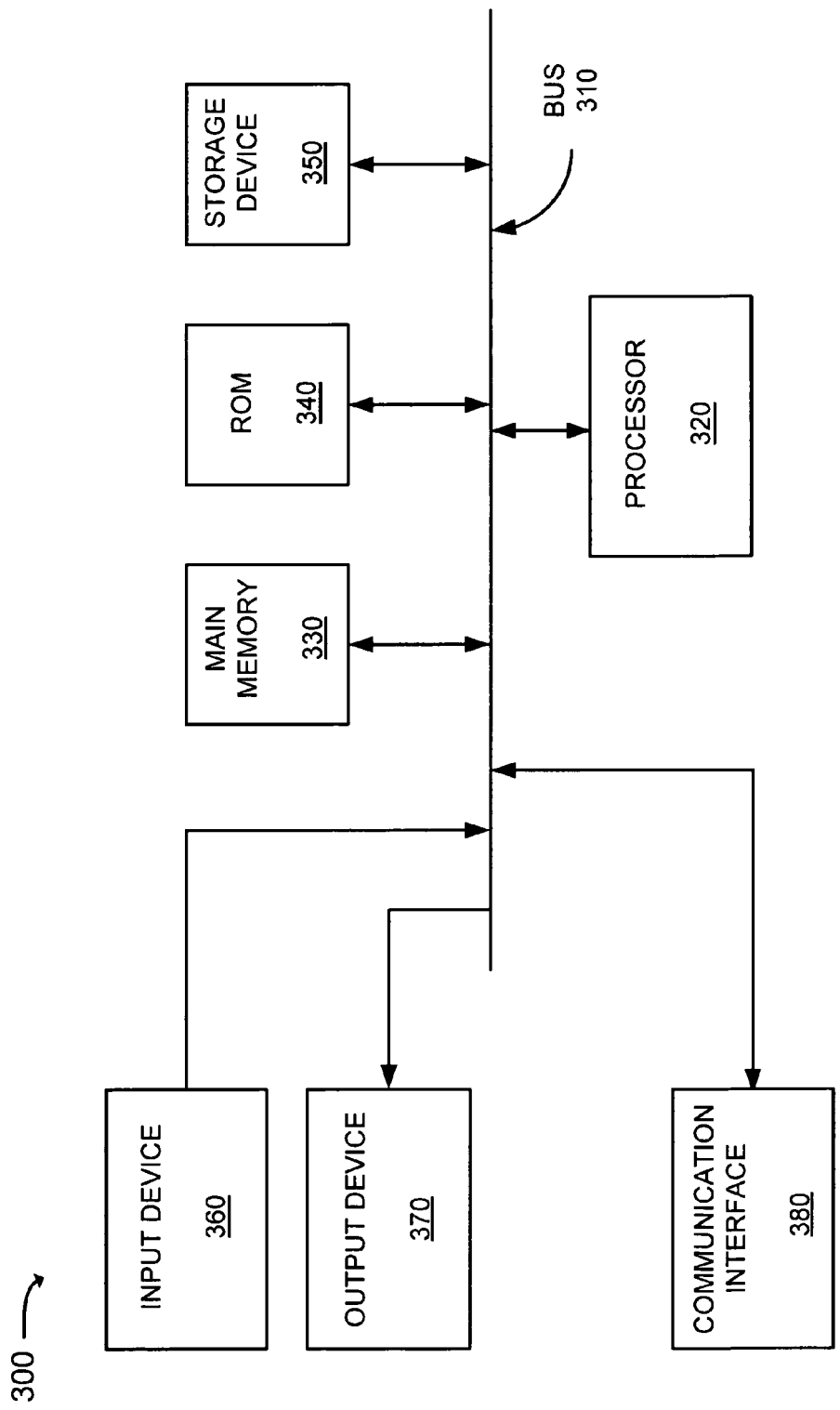
FIG. 3 is an exemplary diagram of a client or server illustrated in FIG. 2.

FIG. 3 is an exemplary diagram of a computing device 300, such as one of clients 210 or servers 220 or 230. Computing device 300 may include a bus 310, a processor 320, a main memory 330, a read only memory (ROM) 340, a storage device 350, an input device 360, an output device 370, and a communication interface 380. Bus 310 may include a path that permits communication among the components of computing device 300.

Processor 320 may include any type of processor, microprocessor, or processing logic that interprets and executes instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits a user to input information to computing device 300, such as a keyboard, a mouse, a pen, voice recognition and/or biometric mechanisms, etc. Output device 370 may include a conventional mechanism that outputs information to the user, including a display, a printer, a speaker, etc. Communication interface 380 may include any transceiver-like mechanism that enables computing device 300 to communicate with other devices and/or systems. For example, communication interface 380 may include mechanisms for communicating with another device or system via a network, such as network 240.

Network service components 225 and content creation component 235 in servers 220-A, 220-B and 230, respectively, may be implemented in software and stored in a computer-readable medium, such as memory 330. A computer-readable medium may be defined as one or more physical or logical memory devices and/or carrier waves.

The software instructions defining network service components 225 and content creation component 235 may be read into memory 330 from another computer-readable medium, such as data storage device 350, or from another device via communication interface 380. The software instructions contained in memory 330 cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

User Distributed Search Results

Consistent with an aspect of the invention, users generating content, such as content created with one or both of content creation component 235 or local content creation component 218, may easily incorporate search results and/or advertisements into their content creation workflow. Incorporation of search results and/or advertisements in the manner described herein will be referred to as user distributed search (UDS).

Figure 4:
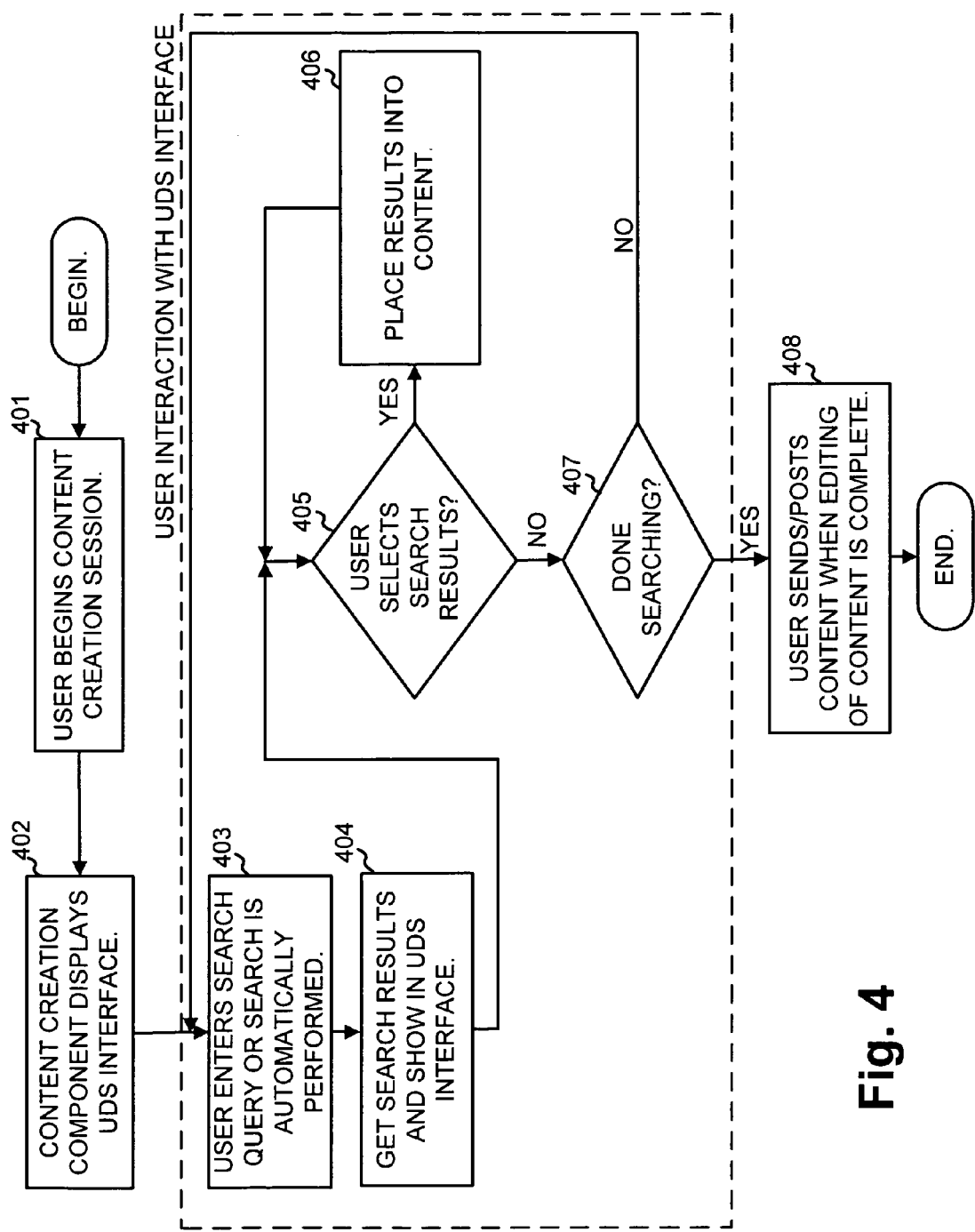
FIG. 4 is a flow chart illustrating exemplary operations consistent with user distributed search.

FIG. 4 is a flow chart illustrating exemplary operations consistent with UDS. A user may begin by opening a content creation application for the type of content that the user desires to create (act 401). For the exemplary operations shown in FIG. 4, assume that the user is composing an email using a web-based email application. That is, assume content creation component 235 provides web-based email services to the user via a browser 215.

Figure 5:
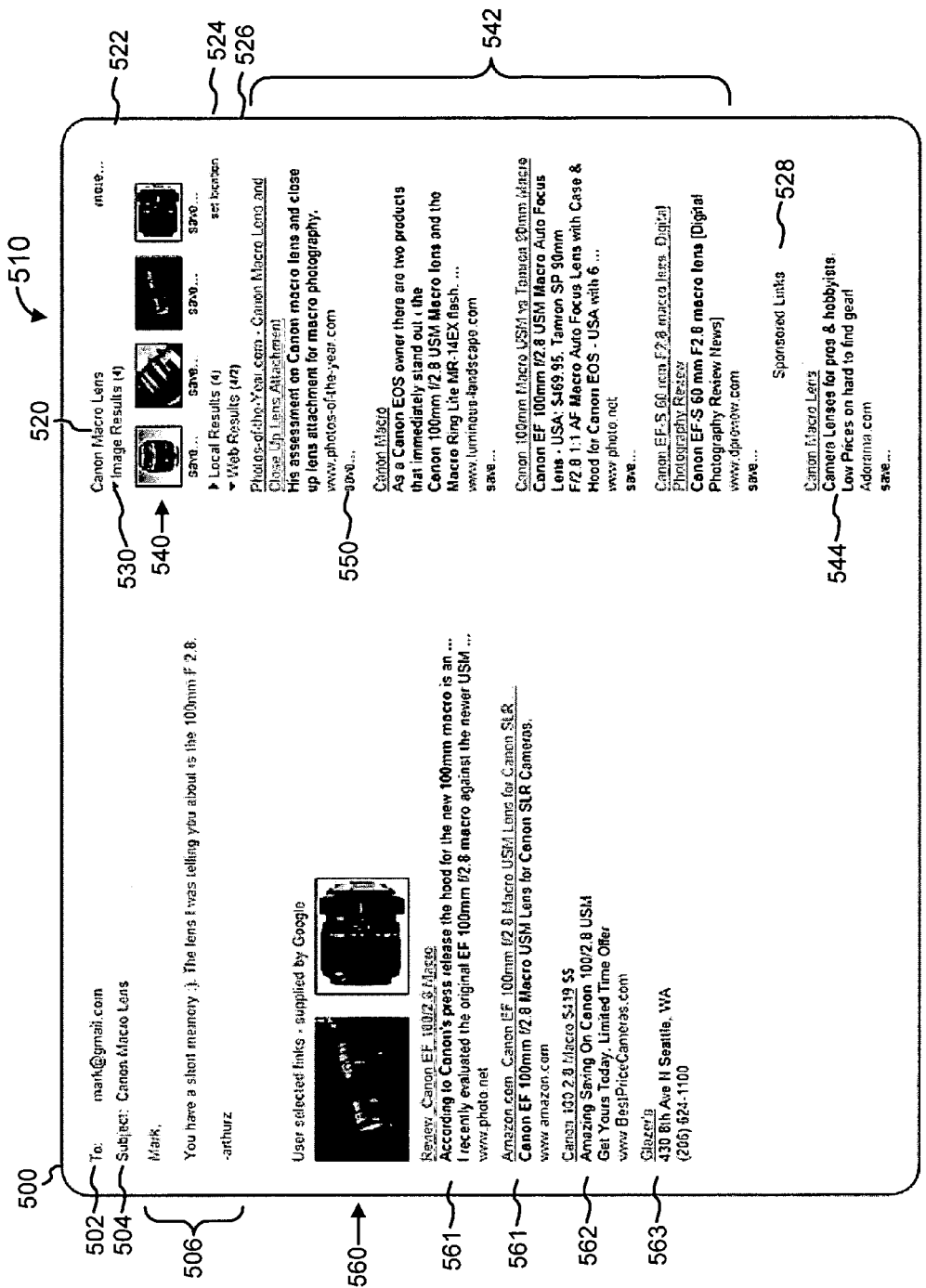
FIG. 5 is a diagram of an exemplary email interface.

Content creation component 235 may provide a graphical interface that includes a UDS section (act 402). FIG. 5 is a diagram of an exemplary email interface 500. Email interface 500 may include fields such as "To:" field 502, "Subject:" field 504, and message field 506 in which the user may compose an email message in a typical manner. Additionally, in this implementation, interface 500 includes a UDS sidebar 510. In some implementations, UDS sidebar 510 may be presented as a graphical window, toolbar, or other element of interface 500 that the user can selectably display or hide from view. As shown, UDS sidebar 510 includes a search query field 520 and a number of search result sections 522-528. In this example, search result sections 522-528 include: image result section 522, local search result section 524, general web search result section 526, and advertisement result section 528. A selectable graphical button, such as arrows 530 may allow the user to hide or view each of search result sections 522-528. As shown, results in local search result section 524 ("local results") are hidden while search result sections 522, 526, and 528 are selected to show search results. In some implementations, the user of the email application may be able to customize which of the search results sections are shown in UDS sidebar 510.

The user may, at some point while composing the email, enter a search query into search query field 520 (act 403). In some implementations, instead of the user manually entering a search, search queries may be automatically generated and/or executed, such as by generating search queries based on content entered by the user, or semi-automatically generated and/or executed, such as by allowing searches to be performed when a user "hovers" over a word or selection with a graphical pointing device (act 403). In response, content creation component 235 may transmit the search query to each of the appropriate network service components 235. In this example, content creation component 235 may transmit the search query to three network service components 235, respectively implementing an image search engine, a local web search engine, and a general web search engine. Content creation component 235 may also transmit the search query to another network search component 235 that implements an advertisement server. The search results returned from each of these four "search objects" may then be shown to the user (act 404). In some implementations, the user may select one of the search results to view the underlying document in a separate browser window.

As illustrated in the example of FIG. 5, the user entered the search query "Canon Macro Lens" into search query field 520. The returned search results include a number of images 540 related to this search, a number of relevant web sites 542 related to the search, and an advertisement 544 related to the search. Each of the returned search results may include a link or other graphical selection object that allows the user to select the search result for inclusion in to the message being composed. In this implementation, a "save" link 550 is shown below each of the search results.

The user may decide to include one or more of the search results in the email (act 405). The user may do so by simply selecting the appropriate save link 550, which causes content creation component 235 to copy the corresponding search result into the email. In response, content creation component 235 may write the selected results to the email, such as to the message field 506 of the email (act 406). As shown, in this example, the user has selected two images 560, two general web results 561, an advertisement 562, and a local search result 563, for inclusion in the email being composed. In one implementation, the results may be automatically placed below message field 506 in the email. In other implementations, content creation component 235 may allow the user to control the placement of the results in the email, such as by graphically dragging different results to different positions in the email. Content creation component 235 may allow the user to implement other editorial controls, such as providing the user with the ability to annotate search results or to add an indication of the search query that was used to generate the search result.

The user may continue to edit the content, enter or refine search queries, and select results for the content until the user is ready to send or post the content (acts 407 and 408). In the example, of FIG. 5, the user may enter a "send email" command when the user is ready to send the email. The email, when received by the recipient, may appear as email 130 (FIG. 1C). The recipient of the email may be able to conveniently view the web pages corresponding to the links by selecting the links. The links underlying the image search results, in particular, may take the user to the web page at which the image is hosted.

As can be seen from FIG. 5, the selected results 560-563, in contrast to links that are typically pasted into emails between users, such as link 125 (FIG. 1B), are formatted in a visually appealing manner and thus provide a higher quality content than typical links that a user would normally paste into content (e.g., such as link 125 of FIG. 1B). More specifically, the links relating to the search results may, as shown in FIGS. 1C and 5, include the actual link to the search result, a short snippet of text that may be selected based on terms in the search query, and the domain corresponding to the returned result. Additionally, the user may select chosen results via a simple process, such as by a single mouse click on a link 550 or by a "drag and drop" selection operation associated with link 550, thus providing even relatively unsophisticated computer users with the ability to enhance their content with search results.

Figure 6:
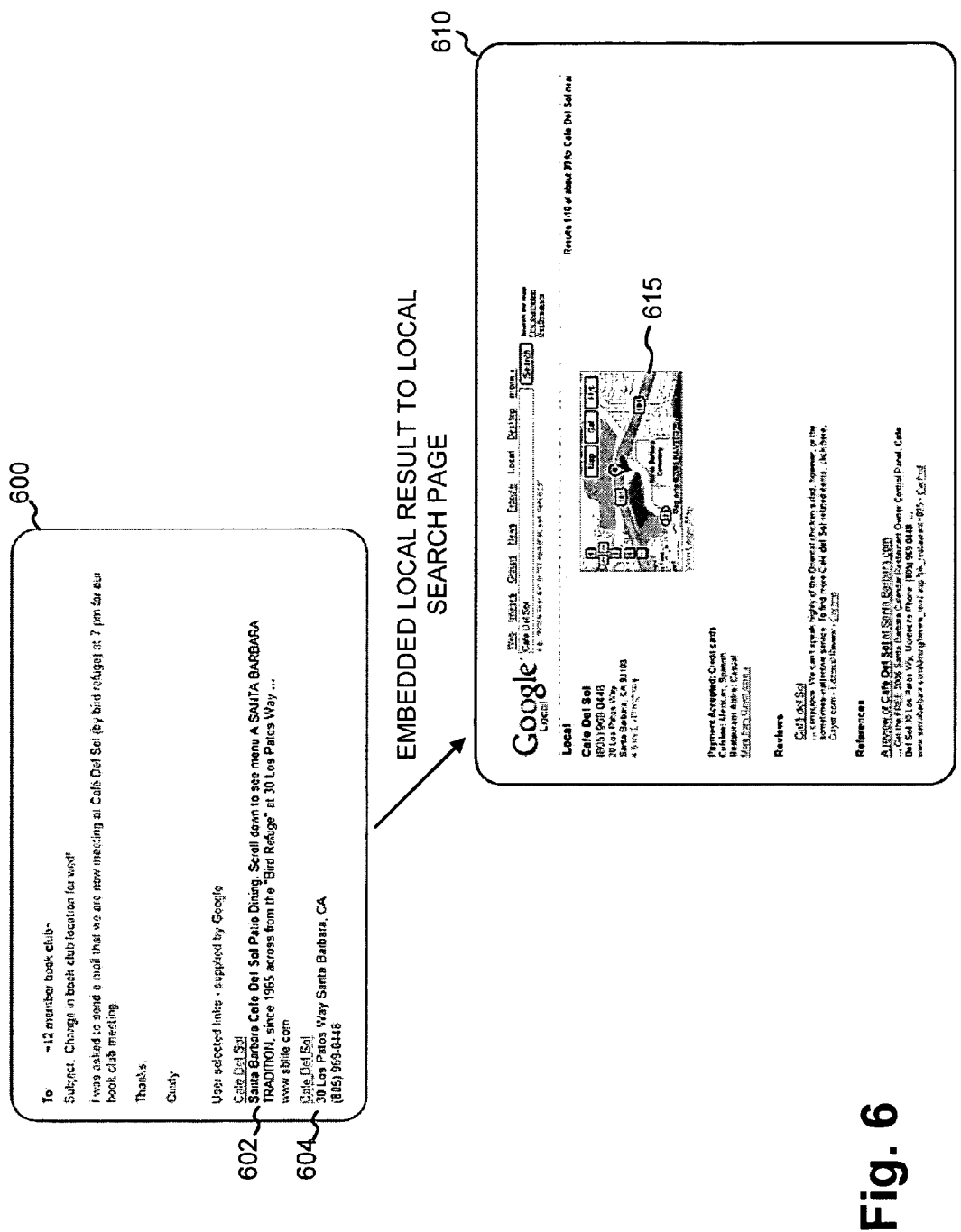
FIG. 6 is an exemplary diagram illustrating an exemplary email message that was annotated to include a search result from a local search engine.

FIG. 6 is a diagram illustrating an exemplary email message that was annotated using UDS to include a search result to a local search engine. In this example, email message 600 is an email message relating to a book club meeting. The sender of the email message is informing the other members of the book club that the meeting location has changed to a local restaurant ("Café Del Sol.") To support this message, the sender has added two search results from a local search engine. The first, result 602, refers to a web page that discusses the restaurant. The second, result 604, links to a local search engine result web page 610 that includes a map 615 showing the location of the restaurant. As illustrated in this example, a user can quickly add links to valuable information to an email, such as a link to a map of a location referred to in the email. In some implementations, instead of a search result being a link to a map, the search result may be a map image that is sent inline with the email message, another type of image, an address, a phone number, or a price of a product that is sent inline with the email message.

Advertisements

In some implementations, content creators that place advertisement links in their content may be given some form of credit if the reader of the advertisement selects the advertisement link. The credit can be monetary or take some other form. Because of the high likelihood that an advertisement incorporated by a content creator into their content is relevant and/or likely to be viewed by the reader, a number of different business models are possible. For example, advertisers may be charged a premium or charged based on a different rate scale for advertisements distributed via UDS.

Additional Exemplary Implementations of UDS

Figure 7:
FIG. 7 is an exemplary interface illustrating application of user distributed search to a message board environment.
Figure 8:
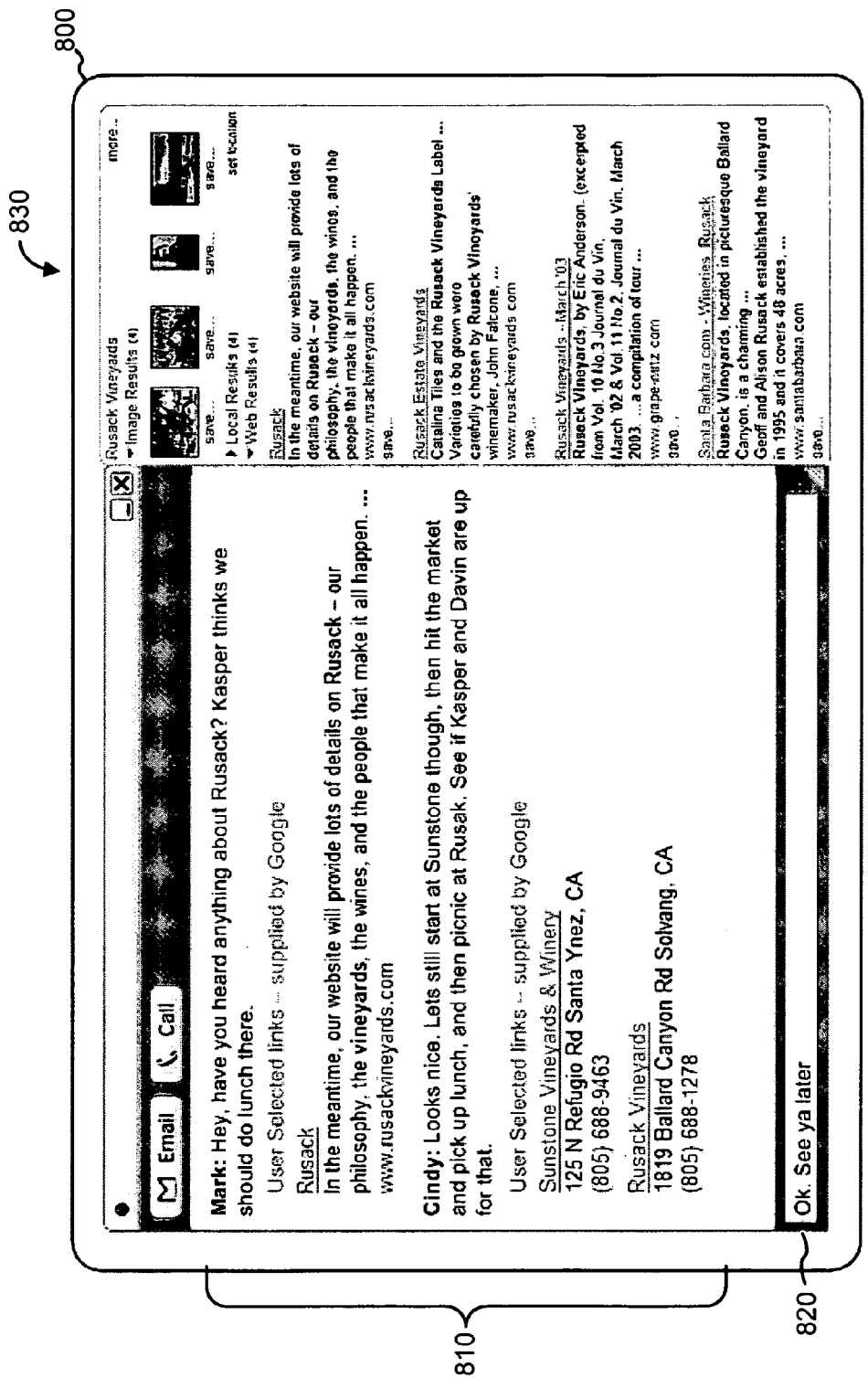
FIG. 8 is an exemplary interface illustrating application of user distributed search to an instant messaging conversation.
Figure 9:
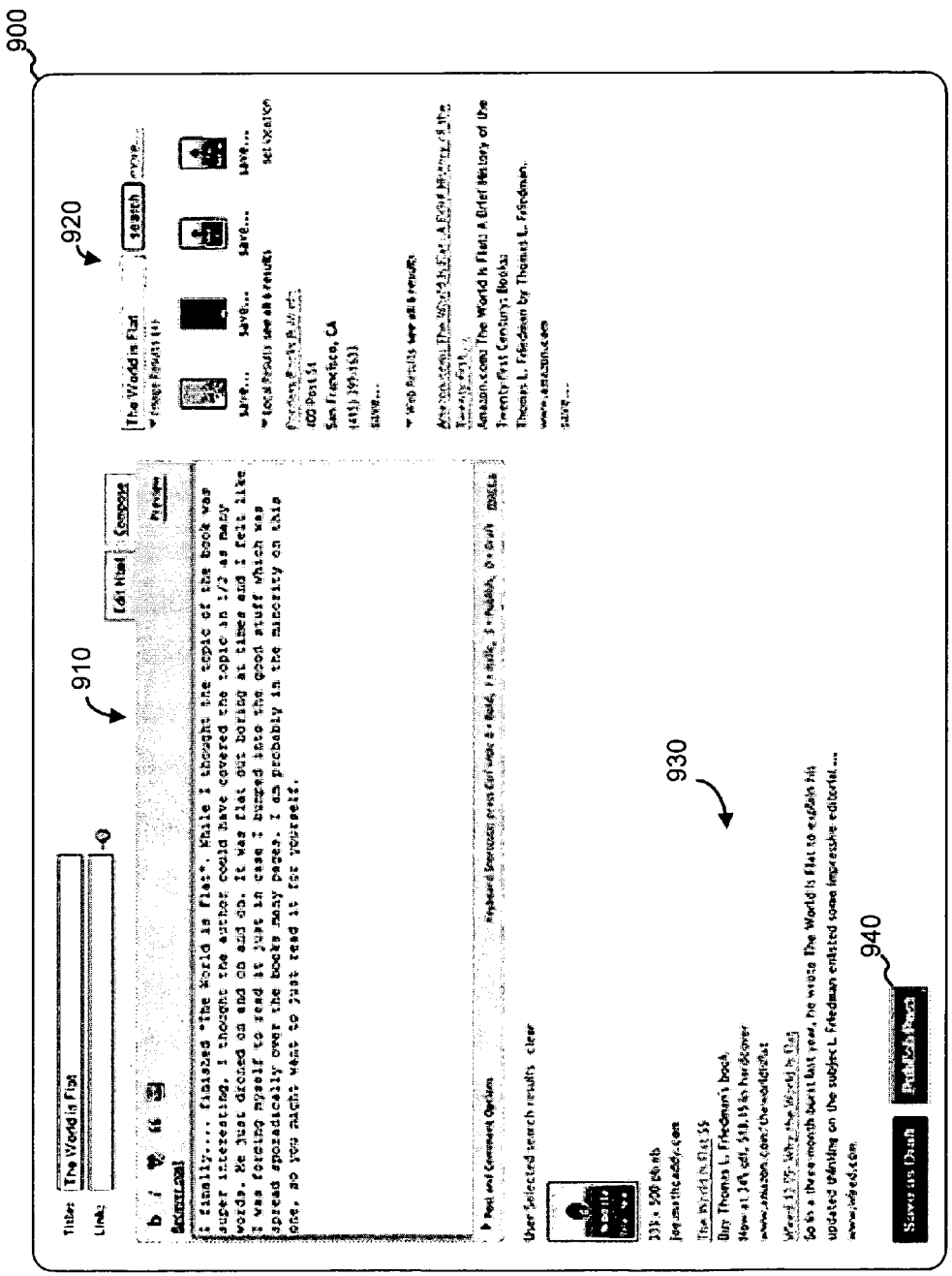
FIG. 9 is an exemplary interface illustrating application of user distributed search to a blog authoring tool.

The above description of UDS was primarily in the context of sending email content. As previously mentioned, UDS can be applied equally well to other forms of content creation. FIGS. 7-9 illustrate other additional applications of UDS.

FIG. 7 is an exemplary interface illustrating application of UDS to a message board environment. A web message board can generally be defined as a facility on the web for holding discussions. Message boards are typically organized into topics in which users post messages relating to the appropriate topic.

In FIG. 7, an exemplary message board interface 700 is presented to a user, such as an interface presented through a browser 215. As shown in interface 700, a first user has posted a message 710 asking for advice relating to a crank for a bicycle. A second user responds with a message 715. Through UDS, the poster supplements message 715 with a number of search results 720. The search results 720 include images 725 of the cranks under discussion, an advertisement 730 for a bicycle store mentioned in message 715, a link 735 to a web site of the company that produces the cranks, and a link 740 pointing to a local distributor of the cranks. Through UDS, the user responding to message 710 was able to effectively supplement the text of message 715 with links that he specifically selected as being relevant to the topic under discussion.

FIG. 8 is an exemplary interface illustrating application of UDS to an instant messaging conversation. Instant messaging can generally be defined as the act of instantly communicating between two or more people over a network such as the Internet.

In FIG. 8, an exemplary instant messaging interface 800 is presented to a user, such as an interface presented by a local content creation component 218 (e.g., an IM client) executing at a client 210. Instant messaging interface 800 includes a message display portion 810 through which transmitted instant messages are displayed, a messaging area 820 in which users may enter messages that they are going to transmit, and UDS interface 830. In this example, the two participants in the conversation (Mark and Cindy) are discussing possible vineyards to visit. Through UDS, each user has selectively augmented their messages with links relating to the particular vineyard under discussion. In this manner, UDS interface 830 can enhance the quality of the instant messaging conversation by, for example, allowing users to both search from within IM interface 800 and easily share selected links from the search with other users.

FIG. 9 is an exemplary interface illustrating application of UDS to a blog authoring tool. A blog (shortened form of weblog or web log) is a website in which items are posted on a regular basis and generally displayed in reverse chronological order.

In FIG. 9, an exemplary interface 900 of a blog authoring tool presented to a user, such as a web based blog authoring tool implemented by content creation component 235 or a locally executed blog authoring tool implemented by local content creation component 218. Interface 900 may include a blog authoring section 910 in which a blogger may enter and edit blog posts. UDS interface 920 allows the blogger to enter search queries and receive search results in a manner similar to UDS sidebar 510 (FIG. 5). Search results selected by the blogger may be displayed in result section 930 of interface 900. When the blogger is ready to publish the post, "publish post" button 940 may cause the text entered by the blogger in section 910 and the search results selected by the blogger in result section 930 to both be published as a single blog post to the blogger's blog.

Additional Details of an Exemplary Implementation of the UDS

It can be recognized that the UDS described above can be implemented using a number of different programming and hardware technologies. A high-level description of one exemplary implementation will now be given.

Figure 10:
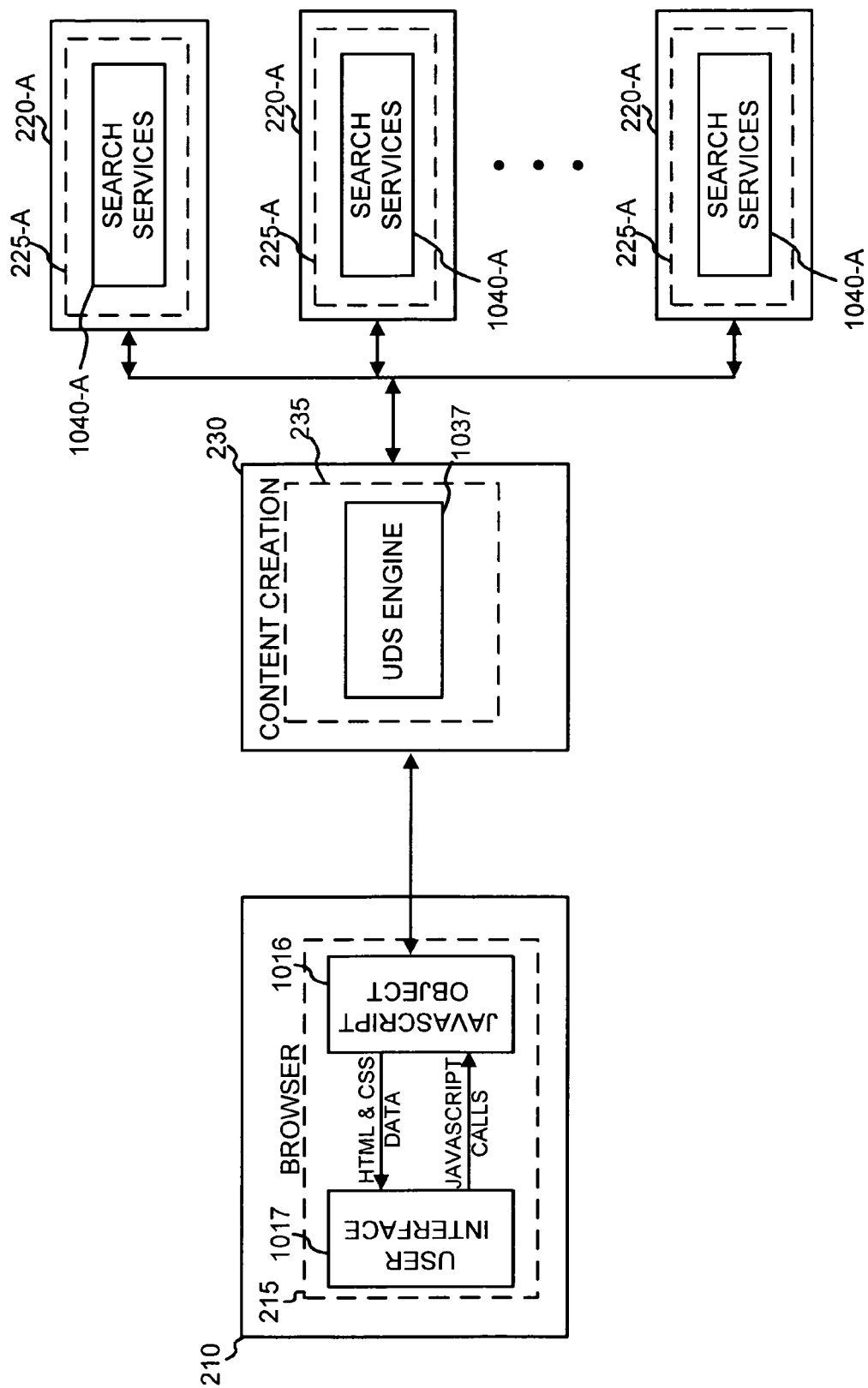
FIG. 10 is a diagram illustrating exemplary components in a user distributed search system.

FIG. 10 is a diagram illustrating exemplary components in a UDS system. As shown in FIG. 10, a client 210 communicates with UDS engine 1037 at application server 230, which may in turn communicate with search services 1040-A through 1040-N at one or more servers 220. In this implementation, portions of the content application, such as an email application, may be a web-based application that is transmitted to browser 215 on an on-demand basis. At browser 215, the email application may include, for example, a JavaScript object 1016 that interfaces with a user interface portion 1017 to provide the final user interface that is displayed in browser 215 based on, for example, HTML (hypertext markup language) and CSS (cascading style sheets) data supplied from JavaScript application 1016.

User interface portion 1017 and JavaScript object 1016 together act to reduce the start-stop start-stop nature of traditional browser-based web applications, as JavaScript object 1016 adds a client-side layer that can handle many of the user interactions with user interface portion 1017. Instead of loading a web page at the start of a user session, browser 215 may load JavaScript application 1016 from server 230 (or, alternatively, from a local cache). JavaScript object 1016 may be responsible for both rendering the interface the user sees and communicating with content creation component of server 230 on the user's behalf.

JavaScript object 1016 may be a dynamically configured object that allows for dynamic selection of which network services, such as which search services 1040, to use. JavaScript object 1016 may implement a number of different functions at client 210. For example, JavaScript object 1016 may allow the interface to be positioned where desired in the client display. Additionally, JavaScript object 1016 may implement a search control object that limits search results to a small number of highly relevant results per search. The search control object may annotate each search result with an element that, when clicked, allows the user to save the search result to the content creation interface.

In some implementations, JavaScript object 1016 may be an object that is designed to be easily integrated into existing web-based JavaScript applications, thus providing a convenient application programming interface (API) through which programmers can incorporate UDS into their programs.

UDS engine 1037 may provide an interface with JavaScript object 1016. In response to JavaScript object 1016, UDS interface may annotate search requests, perform searches through appropriate search services 1040-A through 1040-N, and serialize results of the searches. Search services 1040-A through 1040-N may return search results, such as general web-based search results, image results, etc., or return relevant advertisements, in response to requests from UDS engine 1037.

Additional Concepts

The user selection of search results when creating content may provide an indication that the selected search results are relevant to the search query. For example, the search results selected by a user may be used as part of a reputation network. In general, a reputation network in some way quantifies the reputation or score of users as to their expertise in certain categories or topics. In the context of UDS, if a particular user incorporates a large number of search results into content and the search results are frequently selected by readers of the content, this may be an indication that the user is an "expert" in the topic relating to the content, and his reputation score for the topic may be increased. This application may be particularly relevant to content applications such as message boards, where the message boards are typically categorized by topic.

More generally, regarding reputation, the gesture of selecting a result may be feed back into the system to impact, for example, raw result ranking, raw value of an advertisement, raw reputation of a user performing a selection, or raw reputation of an application using UDS. These raw reputation results can be used, for example, to modify a document or advertisement ranking used by the underlying search engines.

Advertisements presented through UDS may, in particular, represent advertisements that have a higher likelihood of click through and may therefore be more valuable to the advertiser. These advertisements may, for example, cost more than or be provided on different terms than other advertisements. In some implementations, the revenue or other benefit derived from advertisements selected by the content creator may be in some way shared with the content creator. In some situations, the fact that an advertisement is selected by an end user may be used in some way to modify a reputation of the content creator that selected the advertisement.

Additionally, in some implementations, content with search results selected by a user may be additionally automatically modified or supplemented, such as by adding additional links to advertisements or products that are determined to be relevant to the selected search results. As an example of this, consider an advertisement for a merchant included in an email message by the author of the email message. It may be desirable to include an additional advertisement from the merchant in the email, such as an advertisement relating to an offer for free shipping from the merchant. These additional or follow-on advertisements may be displayed within the message itself or as advertisements presented to the user via a different channel. For example, if the recipient of the email message is viewing the email message using a web-based email application, the follow-on advertisement may be displayed outside of the message itself, such as in a portion of the browser that the web-based email application normally uses to present advertisements to its users.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

Moreover, while series of acts have been described with regard to FIG. 4, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device comprising:
a memory to store instructions; and
a processor to execute the instructions to:
enable a user to compose and edit a message via a first interface, where the message includes one or more of an email message, an instant messaging message, a blog post, or a message to an Internet message board,
provide for presentation, via a second interface, first search results received from a search engine,
the first search results being ranked according to a first search query,
receive, via the second interface, a selection, by the user~ of a particular first search result of the first search results,
incorporate, based on the selection, by the user, of the particular first search result, a link to information, associated with the particular first search result, into the message, and
cause an indication of the selection, by the user, of the particular first search result to be forwarded from the device,
a ranking score associated with the particular first search result being modified based on:
incorporating the link to the information associated with the particular first search result into the message, and
determining whether a recipient of the message selects the link,
the modified score being used to adjust a ranking of the particular first search result among a set of second search results associated with a second search query,
when the recipient does not select the link, the modified score including:
the ranking score modified by a first amount that is based on the selection, by the user, of the particular first search result, and
when the recipient does select the link, the modified score including:
the ranking score modified by the first amount and a second amount,
the second amount being based on the recipient selecting the link.

2. The device of claim 1, where the selection of the particular first search result includes a mouse click, by the user, associated with the particular first search result.

3. The device of claim 1, where the processor is further to: cause the first interface and the second interface to be provided to the user simultaneously.

4. The device of claim 1, where the first search results include a plurality of search result types, and
where the processor, when receiving the selection of the particular first search result, is further to:
receive, from the user, information identifying a particular search result type of the plurality of search results types, and
identify, as the selection, a subset of the first search results, the subset being classified in the particular search result type.

5. The device of claim 4, where the subset includes one or more of:
web search results,
image search results,
video search results,
local search results,
geographic search results,
product search results,
listing search results,
email search results,
blog search results,
message group search results,
news search results,
digitized content search results,
desktop search results, or
advertisements.

6. The device of claim 1, where the processor is further to:
enable the user to annotate, in the message and via the first interface, the link to the information associated with the particular first search result.

7. The device of claim 1, where the processor, when incorporating the link into the message, is further to:
enable the user to select, via the first interface, a location within the message to position the link to the information associated with the particular first search result.

8. The device of claim 1, where the particular first search result includes a map, and
where the processor, when incorporating the link to the information associated with the particular first search result into the message, is further to:
include information associated with the map into the message.

9. The device of claim 1, where the processor, when incorporating the link to the information associated with the particular first search result into the message, is further to:
include text summarizing the particular first search result within the message.

10. The device of claim 9, where the text summarizes a relevance of the particular first search result relative to the first search query.

11. The device of claim 1, where the processor, when receiving the selection of the particular first search result, is further to:
- detect a first input from the user to select the particular first search result, and
- detect a second input from the user to move the information associated with the particular first search result from the second interface to the first interface,
- the first input and the second input being different.

12. One or more non-transitory memory devices containing instructions for execution by one or more processing devices, the instructions comprising:
- one or more instructions which, when executed by the one or more processing devices, cause the one or more processing devices to provide, to a user, an interface to compose a message;
- where the message includes one or more of an email message, an instant messaging message, a blog post, or a message to an Internet message board;
- one or more instructions which, when executed by the one or more processing devices, cause the one or more processing devices to initiate a search based on a search query;
- one or more instructions which, when executed by the one or more processing devices, cause the one or more processing devices to receive results of the search;
- one or more instructions which, when executed by the one or more processing devices, cause the one or more processing devices to provide, for presentation to the user, information associated with the results of the search,
  - the information associated with a particular result, of the results of the search, including:
    - a link associated with the particular result, and
    - a snippet of text associated with the particular result;
- one or more instructions which, when executed by the one or more processing devices, cause the one or more processing devices to receive a selection, by the user, of the particular result;
- one or more instructions which, when executed by the one or more processing devices, cause the one or more processing devices to incorporate the link and the snippet of text into the message based on the selection, by the user, of the particular result; and
- one or more instructions which, when executed by the one or more processing devices, cause the one or more processing devices to send, to a search service, an indication of the selection, by the user, of the particular result,
  - a rank score, associated with the particular result, being modified based on:
    - incorporating the link into the message, and
    - determining whether a recipient of the message selects the link associated with the particular result,
  - the modified rank score being used by the search service to rank the particular result among a set of other search results,
  - when the recipient of the message does not select the link associated with the particular result, the modified rank score being modified by a first amount that is associated with the selection, by the user, of the particular result, and
  - when the recipient of the message does select the link associated with the particular result, the modified rank score being modified by the first amount and a second amount that is associated with the recipient of the message selecting the link.

13. The one or more memory devices of claim 12, where the one or more instructions to receive the selection of the particular result include:
- one or more instructions to receive a mouse click relating to the particular result, or
- one or more instructions to detect that the user performed a drag and drop operation relating to the particular result.

14. The one or more memory devices of claim 12, where the one or more instructions to initiate the search based on the search query include:
- one or more instructions to forward data associated with the search query to the search service,
  - the search service returning one or more search result types.

15. The one or more memory devices of claim 14, where the one or more search result types include at least one of:
- web search results,
- image search results,
- video search results,
- local search results,
- geographic search results,
- product search results,
- listing search results,
- email search results,
- blog search results,
- message group search results,
- news search results,
- digitized content search results,
- desktop search results, or
- advertisements.

16. The one or more memory devices of claim 14, where the one or more instructions to transmit the search query to the search service include:
- one or more instructions to receive a selection, by the user, identifying the search service from a plurality of search services.

17. A method comprising: providing, by one or more client devices and to a user, a first interface to facilitate composition and editing of a message by the user;
- where the message includes one or more of an email message, an instant messaging message, a blog post, or a message to an Internet message board;
- receiving, by the one or more client devices and from the user via the first interface, information associated with the message;
- providing, by the one or more client devices and to the user, a second interface that presents search results retrieved from a remote search service;
- receiving, by the one or more client devices and via the second interface, a selection, by the user, of a particular search result of the search results;
- incorporating, by the one or more client devices and based on the selection, by the user, of the particular search result, a link associated with the particular search result into the message to form a modified message;
- causing, by the one or more client devices, the modified message to be sent to a recipient; and
- causing, by the one or more client devices, an indication of the selection, by the user, of the particular search result, to be sent to the remote search service,
  - a rank score, associated with the particular search result, being adjusted based on:
    - incorporating the link associated with the particular search result into the message, and
    - determining whether the recipient selects the link associated with the particular search result, the adjusted rank score being used to rank the particular search result among another set of search results, when the link associated with the particular search result is not selected by the recipient, the adjusted rank score including the rank score adjusted by a first amount that is based on the selection, by the user, of the particular search result, and when the link associated with the particular search result is selected by the recipient, the adjusted rank score including the rank score adjusted by the first amount and a second amount that is based on the link, associated with the particular search result, being selected by the recipient.

18. The method of claim 17, further comprising:

presenting the first interface and the second interface simultaneously for display by a client device of the one or more client devices.

19. The method of claim 17, where the particular search result corresponds to a first advertisement, and where the method further comprises:

selecting a second advertisement based on the first advertisement; and including information regarding the second advertisement within the message.

\* \* \* \* \*